Inventor:
Nikita Saruchanoff
by
Paul Ferchland
Attorney

Patented Mar. 10, 1936

2,033,153

UNITED STATES PATENT OFFICE 2,033,153

LIQUID LEVEL GAUGE

Nikita Saruchanoff, Berlin-Charlottenburg, Germany

Application November 21, 1933, Serial No. 699,038
In Rumania November 23, 1932

2 Claims. (Cl. 73—54)

This invention relates to a device for ascertaining the weight of a liquid in a container, more especially in overground gasoline tanks by means of a U-shaped pipe connected with the tank and preferably filled with mercury. The invention consists in connecting a compressed-air line with the air space of the tank by a line capable of being shut and providing at the top of the line connecting the U-pipe with the tank an opening capable of being closed, for instance a cock, or the like, and at the U-pipe itself a second cock for withdrawing or supplying mercury, and a zero-adjusting device carrying a slider, or the like, for indicating the zero-point, to which the mercury level is to be adjusted in each case of measuring the weight of the liquid contained in the tank. Furthermore according to my invention the U-pipe consists of two separate legs tightly connected with a suitable connecting bridge carrying the above-mentioned delivery cock, the parts being so arranged that each of the legs when broken can be replaced by a fresh one.

The invention is illustrated in the annexed drawings showing some modifications.

Figure 1:
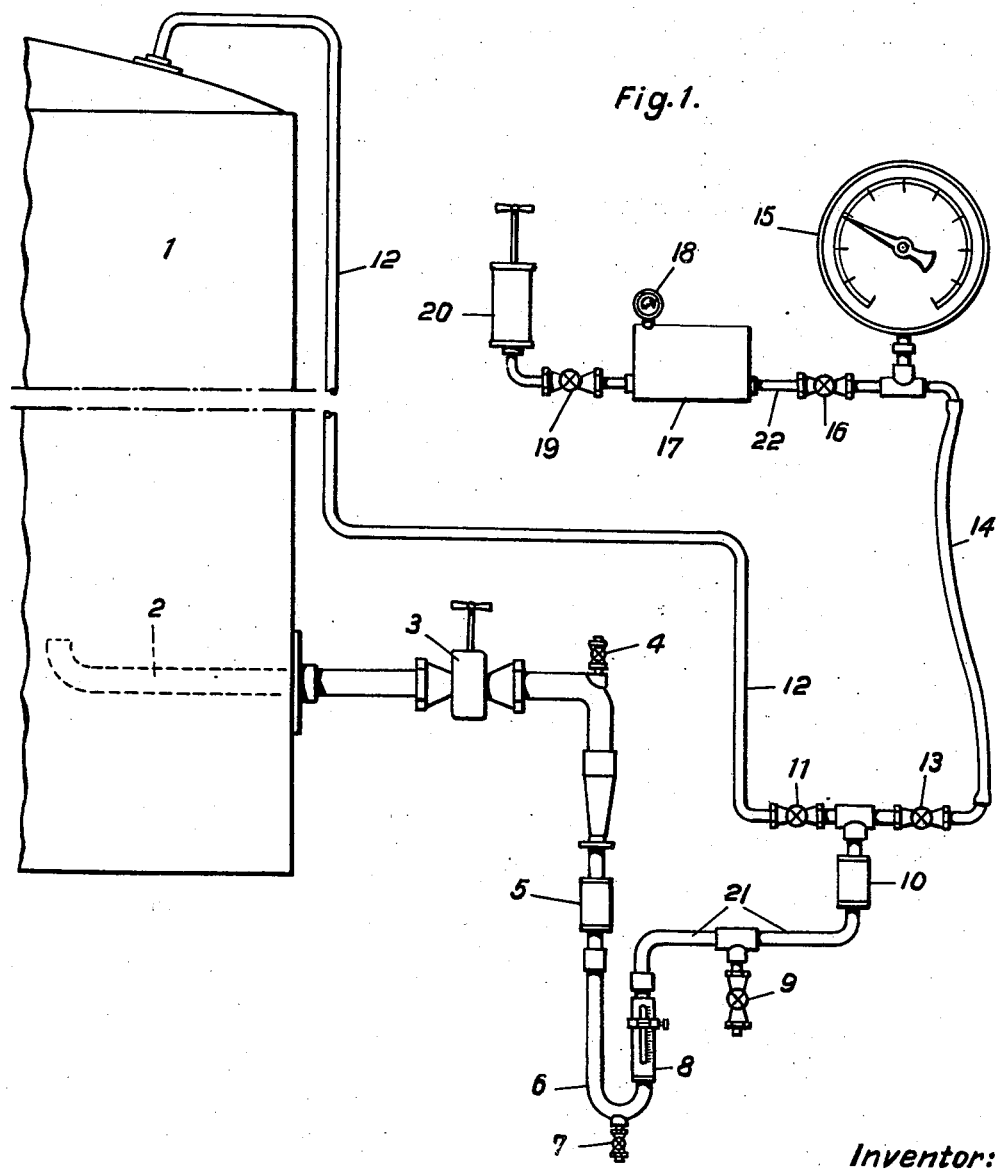
Figure 2:
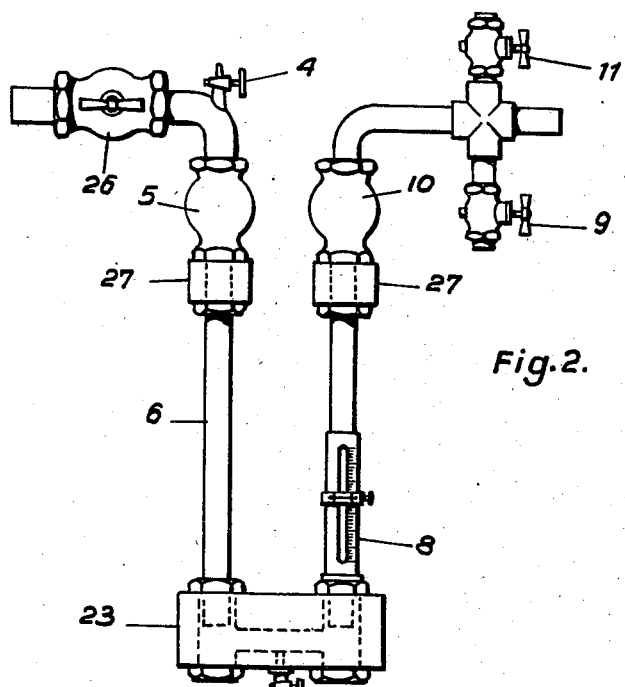
Figure 3:
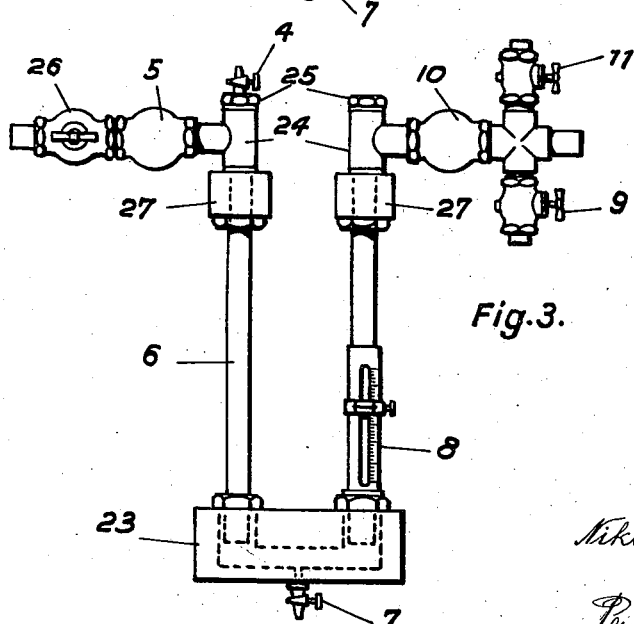

Figure 1 shows the complete arrangement of a weighing apparatus according to the invention connected with an overground tank, whereas Figures 2 and 3 illustrate on an enlarged scale two different modifications of the exchangeable U-shaped pipe.

At a small distance from the bottom of the tank a pipe 2 about 1½ to 2 inches in diameter is secured to the tank I so that a portion of it extends into the tank, its outer end being provided with a slide valve 3, or the like, and at the top with an opening capable of being closed, as for instance a cock 4. This cock is for letting off any air which could arrive from the tank into the pipe 2 and exert a pressure on the liquid in the tube, so that only the hydrostatic pressure of the liquid in the pipe 2 is effective. An additional important function of the opening 4 will be described hereafter. Beneath the check valve 5 a U-shaped pipe 6 pervious to light, preferably made of glass is provided which is preferably filled with mercury and carries at its lower end a cock 7 for supplying or discharging mercury. The right hand leg of the U-pipe is connected to a compressed-air line 21 and provided with a zero-adjustment device 8 consisting of a scale and a slider adjustable thereon which may be adjusted to the zero-line of the mercury required for measuring operation to which afterwards the mercury level is to be regulated in each case of measuring the weight by means of the compressed-air line.

The transition of mercury into the line 2 or the tank or the compressed-air line 14 connected to line 21 is prevented by the check valves 5 and 10, should the pressure on one or the other leg of the U-pipe rise to an excessive extent. When the pressure in the line 21 is too high, the cock 9 is opened until the mercury in the zero-adjustment device 8 has attained the zero-line determined by the slide, whereas when the pressure in the line 21 is too low, further compressed air is introduced from the compressed-air container 17 by opening the cocks 13 and 16 until the mercury is also again adjusted to the given zero-line.

The compressed-air container 17 which may have small dimensions and is preferably provided with a controlling gauge 18 is filled by a simple hand pump 20 which is connected by opening the cock 19. The precisely measuring pressure gauge 15 adjusts itself when closing cock 16 and opening cock 13 to the pressure existing in the compressed-air line 14, 21 and thereby exactly indicates the hydrostatic pressure existing in the tank when adjusting the mercury in the U-pipe 6 to the zero-point fixed by the slide. Air container 17 hand air pump 20 and gauge 15 form a portable device which may be used for any number of tanks and is connected by means of the flexible pipe 14 to the U-pipe which is formly secured together with its appliances to the tank.

The compressed-air pipe 21 further communicates with the air space of the tank by a pipe 12 which may be closed by means of the cock 11. A pressure formed in the tank by vapors above the liquid may therefore be eliminated completely by connecting the air space of the tank with the compressed-air line 21 so that the gauge 15 in fact only indicates the exact hydrostatic pressure in the tank.

In the modification shown in Figures 2 and 3 the U-pipe 6 is made exchangeable and consists of two legs tightly connected at their lower ends with a connecting bridge 23, carrying the cock 7 for supplying or withdrawing mercury. The upper ends of the legs are likewise tightly connected with separate connecting elements 27 either immediately communicating with the check valves 5, 10 (Figure 2) or being connected to the latter by means of a T-shaped piece 24 (Figure 3). These T-shaped pieces are closed on the other side by means of screws 25, one of which may be provided with an opening capable of being closed. Should one or the other leg of the communicating pipe 6 break, the connecting bridge 23 and the pieces 27 may be unscrewed and the defective leg may be immediately replaced by a new one. The valve 26 is a controlling valve permitting liquid coming from the tank to gradually enter the communicating pipe 6. This gradual flow is not readily attainable with the slide valve 3.

The weight of the liquid contained in the tank is measured by the apparatus according to the present invention in the following way:

At first the slide valve 3 and the opening 4 at the top of line 2 are opened whereby the liquid enters until it reaches the mercury in the left hand leg of the U-pipe, the air contained in the pipe 2 being discharged by the opening 4. The same level of this discharge opening in the tank corresponds to the surface of the permanent residue in the tank which is in any case neglected when measuring the weight of the liquid in the tank. Now when closing the slide valve 3 and opening the discharge cock 9 there is only the pressure of the liquid column in the left hand leg of the U-pipe 6 acting upon the mercury in the pipe, the mercury in the right hand leg of the U-pipe rising to a level above that in the left hand leg by a value corresponding to the pressure of the liquid column in the left hand leg up to the discharge point of the opening 4. The mercury level appearing in the right hand leg of the U-pipe is then the zero-point for the measurements of the weight of the liquid in the tank, to which point the slider of the zero-adjustment device 8 is exactly adjusted. The opening 4 and the cock 9 are now closed and then the slide valve 3 and the cocks 13 and 16 are opened so that the whole height of the liquid of the tank acts upon the left hand leg of the U-pipe, and the compressed air acts on the right hand leg. Hereupon the cock 16 is again closed. Now when the mercury in the right hand leg of the U-pipe appears below the zero-point fixed by the slider of the zero-adjustment device, compressed air from the line 21, 14 is withdrawn by pipe 9 until the mercury in the right hand leg rises up to the slider of the zero-adjustment device 8. When, however, the mercury level in the right hand leg of the U-pipe appears above the zero-point fixed by the slider, compressed air from the container 17 is introduced by the cock 16 until the mercury level in the right hand leg has been lowered to the zero-point marked by the slider. The hydrostatic pressure existing in the tank above the permanent residue, i. e., above the level of the opening 4, then exactly balances the pressure of the compressed-air line and thus can be read off from the pressure gauge. By multiplying the pressure indicated by this gauge by the area of the bottom surface of the tank at once the weight of the whole liquid contained in the tank above the surface of the permanent residue is obtained. The weight of the liquid column in the left hand leg of the U-shaped pipe 6 is hereby eliminated in the most simple manner by means of the above-described adjustment of the slider of the zero-adjustment device 8 with the aid of the opening 4 capable of being closed.

I claim:—

1. In an apparatus for ascertaining the weight of the liquid in a container, the combination of a U-shaped pipe filled with mercury and communicating with a container, a compressed air line supplied with a pressure gauge and connected to the said U-pipe, and communicating by a line, capable of being closed, with the airspace of the container, vent means at the top of the line connecting the U-shaped pipe with the tank, a cock for withdrawing and supplying mercury connected with the said U-shaped pipe, and a zero-adjustment device comprising a slider indicating the zero-point.

2. In an apparatus for ascertaining the weight of the liquid in a container, the combination of an exchangeable U-shaped pipe, comprising two separate legs, connected by a separate bridge, filled with mercury and communicating with a container, a compressed-air line supplied with a pressure gauge and connected to the said U-pipe, and communicating by a line, capable of being closed, with the air-space of the container, vent means at the top of the line connecting the U-shaped pipe with the tank, a cock for withdrawing and supplying mercury connected with the said connecting bridge, and a zero-adjustment device comprising a slider indicating the zero-point.

NIKITA SARUCHANOFF.